United States Patent
Yen

(10) Patent No.: US 8,482,253 B2
(45) Date of Patent: Jul. 9, 2013

(54) BATTERY CHARGE-DISCHARGE PATH MANAGEMENT CIRCUIT AND METHOD THEREOF

(75) Inventor: Wei-Ting Yen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 378 days.

(21) Appl. No.: 12/846,038

(22) Filed: Jul. 29, 2010

(65) Prior Publication Data

US 2011/0127965 A1 Jun. 2, 2011

(30) Foreign Application Priority Data

Dec. 2, 2009 (TW) .............................. 98141265 A

(51) Int. Cl.
*H02J 7/00* (2006.01)
(52) U.S. Cl.
USPC .......................................................... 320/128

(58) Field of Classification Search
USPC .................................. 320/103, 127, 128, 137
See application file for complete search history.

(56) References Cited

U.S. PATENT DOCUMENTS

| 5,939,862 | A | * | 8/1999 | Kates et al. | 320/125 |
| 6,127,809 | A | * | 10/2000 | Kates et al. | 320/134 |
| 2007/0096692 | A1 | * | 5/2007 | Chuang et al. | 320/128 |

* cited by examiner

*Primary Examiner* — Richard V Muralidar
(74) *Attorney, Agent, or Firm* — Rabin & Berdo, P.C.

(57) ABSTRACT

A battery charge-discharge path management circuit includes a first determination circuit, a second determination circuit and a switch circuit. The first determination is for determining whether the battery module and the electronic device are in a charge state or in a discharge state at the same time. The second determination circuit is for determining whether the electronic device is coupled to the battery module. The switch circuit forms a charge-discharge path between the battery module and the electronic device both if the battery module and the electronic device are in the discharge state or in the charge state at the same time and if the electronic device is coupled to the battery module.

14 Claims, 2 Drawing Sheets

BATTERY CHARGE-DISCHARGE PATH MANAGEMENT CIRCUIT AND METHOD THEREOF

This application claims the benefit of Taiwan application Serial No. 98141265, filed Dec. 2, 2009, the subject matter of which is incorporated herein by reference.

BACKGROUND OF THE INVENTION

1. Field of the Invention

The invention relates in general to a charge-discharge path management circuit and method thereof, and more particularly to a battery charge-discharge path management circuit and a method thereof.

2. Description of the Related Art

With the popularity of electronic devices and rapid advance in technology, the consumers have higher and higher expectations on the functions of electronic devices and the manufacturers of electronic devices are dedicated to making electronic devices thinner, lighter and compacter so as to provide better portability to the consumers. Electronic devices are such as notebook computers. In the absence of an external power, the battery module of a portable notebook computer provides necessary power. Thus, how to make the battery module constantly supplying a steady power so that the electronic device can function normally has become a prominent task to the manufacturers. The battery module can be realized by a smart battery which has management function for providing relevant battery data such as battery status or the residual capacity of the battery.

However, the current electronic devices merely manage and communicate with the battery module through a system management bus (SMBus). That is, the electronic devices manage and communicate with the battery by software control. For example, if an electronic device is connected to an AC adaptor, the software requests the battery module to be charged, and the battery is charged accordingly. If the software does not indicate the charge-discharge status (for example, the electronic device is off the charge status) instantly after the AC adaptor is unplugged, then the battery module will be unable to judge whether to be charged (there is an AC adaptor connected to the electronic device) or to provide power. Consequently, the battery module will be pending and the electronic device may be shut down unexpectedly.

SUMMARY OF THE INVENTION

Examples of the invention are directed to a battery charge-discharge path management circuit and method thereof. A charge-discharge path is formed according to the status (the charge status or the discharge status) of a battery module and an electronic device, for charging the battery module through the electronic device charge or providing power from the battery module to the electronic device, so as to provide a charge-discharge environment with high efficiency and high security.

According to a first example of the present invention, a battery charge-discharge path management circuit including a first determination circuit, a second determination circuit and a switch circuit is provided. The first determination circuit is for determining whether the battery module and the electronic device are in a charge status or in a discharge status at the same time. The second determination circuit is for determining whether the electronic device is coupled to the battery module. The switch circuit forms a charge-discharge path between the battery module and the electronic device both if the battery module and the electronic device are in the discharge status or in the charge status at the same time and if the electronic device is coupled to the battery module.

According to a second example of the present invention, a battery charge-discharge path management method is provided. Whether a battery module and an electronic device are in a discharge status or in a charge status at the same time is determined. Whether the electronic device is coupled to the battery module is determined. A charge-discharge path is formed between the electronic device and the battery module both if the battery module and the electronic device are in the discharge status or in the charge status at the same time and if the electronic device is coupled to the battery module.

The invention will become apparent from the following detailed description of the preferred but non-limiting embodiments. The following description is made with reference to the accompanying drawings.

DETAILED DESCRIPTION OF THE INVENTION

Figure 1:
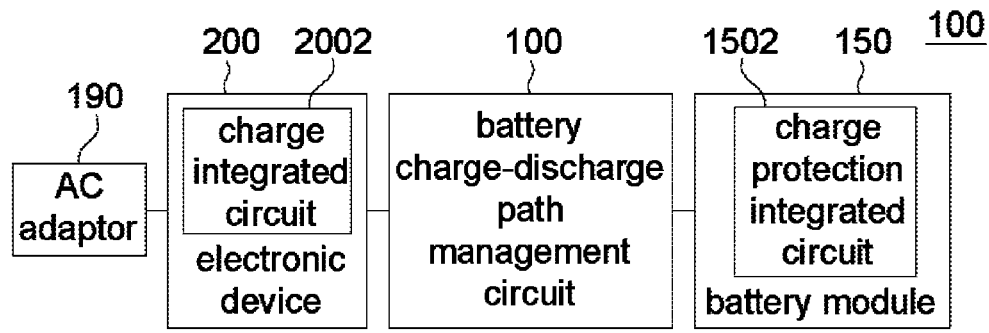
FIG. 1 shows a battery charge-discharge path management circuit adapted to a battery module and an electronic device according to an embodiment of the invention.

An embodiment of the invention is exemplified by a battery charge-discharge path management circuit adapted between a battery module and an electronic device. Referring to FIG. 1, a battery charge-discharge path management circuit adapted to a battery module and an electronic device according to an embodiment of the invention is shown. As indicated in FIG. 1, the battery charge-discharge path management circuit 100 is coupled to a battery module 150 and an electronic device 200. If the electronic device 200 is connected to the AC adaptor 190, the AC adaptor 190 can supply a power to the battery module 150 (that is, to charge the battery module). If the electronic device 200 is not connected to the AC adaptor 190, the battery module 150 can supply power to the electronic device 200. The electronic device 200 can be realized for example but not limited by a notebook computer.

Figure 2:
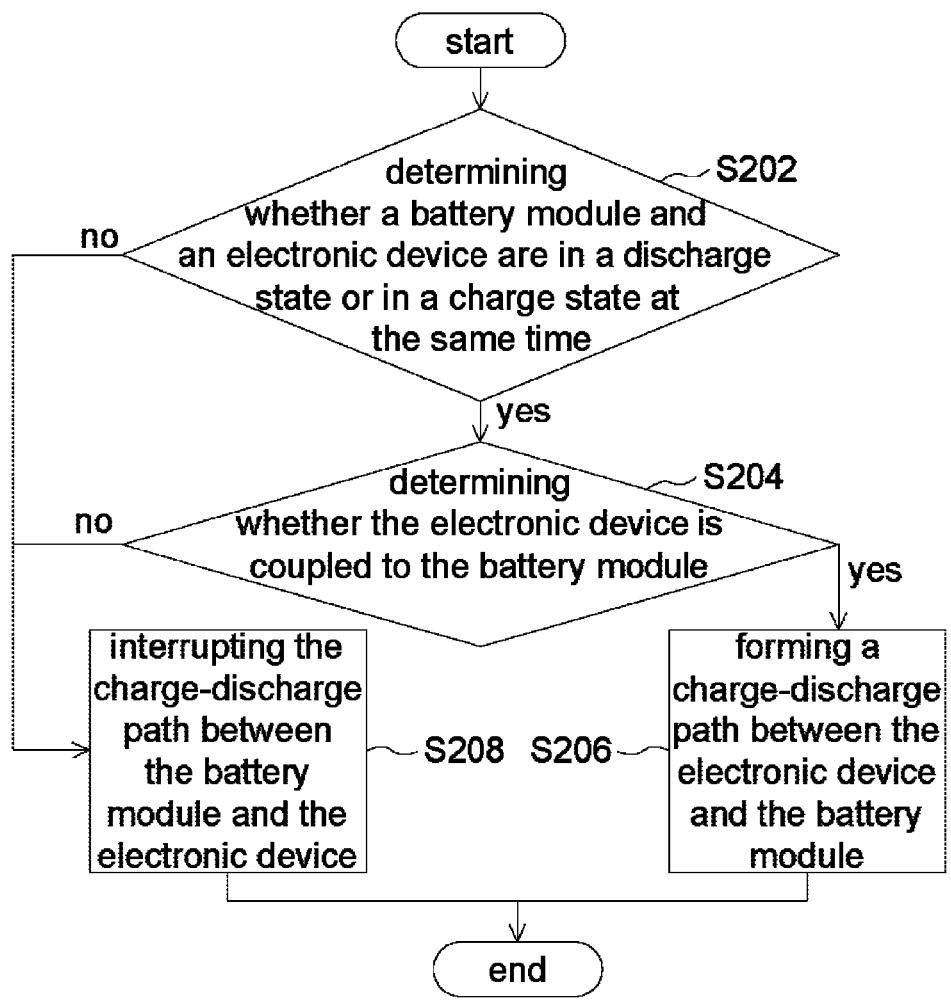
FIG. 2 shows a flowchart of a battery charge-discharge path management according to then embodiment of the invention.
Figure 3:
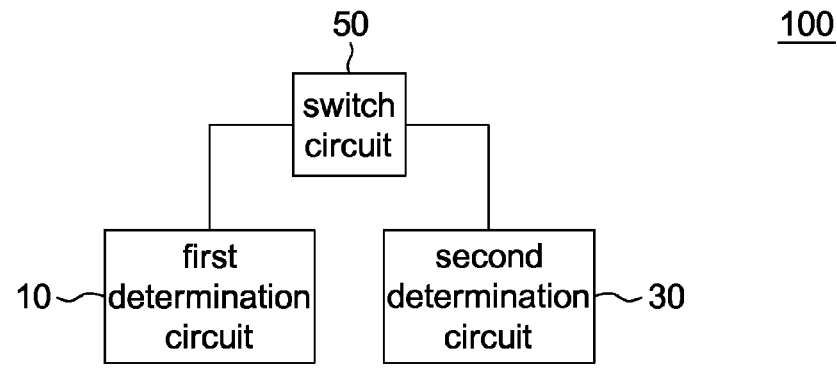
FIG. 3 shows a block diagram of the battery charge-discharge path management circuit of FIG. 1.

Referring to both FIG. 2 and FIG. 3. FIG. 2 shows a flowchart of a battery charge-discharge path management according to the embodiment of the invention. FIG. 3 shows a block diagram of the battery charge-discharge path management circuit of FIG. 1. The battery charge-discharge path management circuit includes a first determination circuit 10, a second determination circuit 30 and a switch circuit 50. The battery charge-discharge path management method, which can be adapted in the battery charge-discharge path management circuit 10 are as follows.

At step S202, whether the battery module 150 and the electronic device 200 are in a charge state or in a discharge state at the same time is determined by the first determination circuit 10. If it is determined that the battery module 150 and the electronic device 200 are in the discharge state or in the charge state at the same time (i.e. the battery module 150 and the electronic device 200 are in the same state at the same time), then step S204 is performed. If it is determined that the battery module 150 and the electronic device 200 are not in the discharge state or in the charge state at the same time (i.e. the battery module 150 and the electronic device 200 are not in the same state at the same time), then step S208 is performed. The electronic device 200 further includes a charge integrated circuit 2002, wherein the first determination circuit 10 determines whether the electronic device 200 is in the charge state or in the discharge state according to the charge integrated circuit 2002.

For example, the first determination circuit 10 detects one pin of the charge integrated circuit 2002, which indicates whether the AC adaptor 190 is coupled to the electronic device 200. If the AC adaptor 190 is coupled to electronic device 200, then, according to the detected pin, the electronic device 200 is in the charge state. If the AC adaptor 190 is not coupled to electronic device 200, then, according to the detected pin, the electronic device 200 may be in the discharge state. In an example, the pin can be realized by an ACOK pin of the charge integrated circuit 2002.

Besides, the battery module 150 may further include a charge protection integrated circuit 1502, wherein the first determination circuit 10 determines whether the battery module 150 is in the charge state or in the discharge state according to the charge protection integrated circuit 1502. For example, the first determination circuit 10, such as, detects the pins of the charge protection integrated circuit 1502, which indicate that the battery module 150 is in the charge state or in the discharge state. For example, the charge protection integrated circuit 1502 has two pins indicating the charge state or the discharge state; and the first determination circuit 10 may include an AND gate. Then, by the AND gate, whether the battery module 150 is in the charge state or in the discharge state can be determined according to the state (such as high potential or low potential) of the two pins. For example, if the AND gate outputs a high logic signal "1", then the battery module 150 is one of the charge state and the discharge state. In an example, the two pins can be realized by a CHD pin and a DGD pin of the charge protection integrated circuit 1502.

Figure 4:
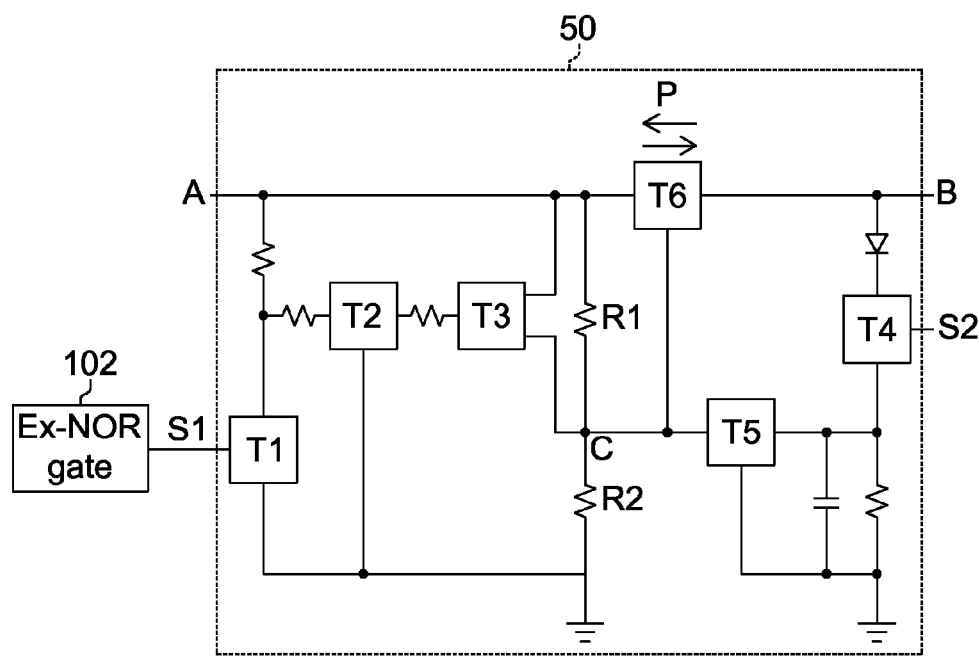
FIG. 4 shows a switch circuit implementing step S206 of FIG. 2.

Referring to both FIG. 3 and FIG. 4, the first determination circuit 10 further includes an exclusive NOR gate 102. For example, the electronic device 200 and the battery module 150 are concurrently in the charge state (if both outputting a high logic signal "1" to the first determination circuit) or in the discharge state (if both outputting a low logic signal "0" to the first determination circuit), then the first determination circuit 10 generates a high logic signal "1" to indicate that the electronic device 200 and the battery module 150 may be in the same state (both in the charge state or both in the discharge state). However, such determination can be implemented by a combination of other electronic circuits and the signal indicating charge or discharge state (that is, the signal denoting high potential or low potential) can be designed according to practical implementations, and is not subject to any specific restrictions here.

At step S204, whether the electronic device 200 is coupled to the battery module 150 is determined by the second determination circuit 30. If it is determined that the electronic device 200 is coupled to the battery module 150, then step S206 is performed. If electronic device 200 is not coupled to the battery module 150, then step S208 is performed. For example, the electronic device 200 further includes a system management bus (SMBus) (not illustrated) communicating with the battery module 150. The second determination circuit 30 informs the system management bus about the results of determination (such as whether the battery module is coupled to the electronic device). The software communicates with a physical circuit through the system management bus and therefore the software can confirm the current status of the battery module 150 (that is, whether the battery module 150 is coupled to an electronic device for being charged or being discharged).

At step S206, if the battery module 150 and the electronic device 200 are in the discharge status or in the charge status (i.e. in the same status) at the same time and if the electronic device 200 is coupled to the battery module 150, a charge-discharge path is formed between the battery module 150 and the electronic device 200 by the switch circuit 50. An example is disclosed below for detailed description.

Referring to FIG. 4, a switch circuit for implementing step S206 of FIG. 2 is shown. For example, the switch circuit 50 has many switch elements. In an implementation, the switch circuit 50 includes a first switch to a sixth switch T1~T6. For example, the first switch T1 and the fifth switch T5 are both realized by an N-type metal-oxide-semiconductor field-effect transistor (NMOS); the fourth switch T4 and the sixth switch T6 are both realized by a P-type metal-oxide-semiconductor field-effect transistor (PMOS); and the second switch T2 and the third switch T3 are respectively realized by an N-type bipolar junction transistor (BJT) (for example, NPN) and a P-type bipolar junction transistor (BJT) (for example PNP). The terminal A denotes a terminal coupled to the battery module 150; the terminal B denotes a terminal coupled to the electronic device 200; the terminal S1 is an output of the first determination circuit 10 and the terminal S2 is an output of the second determination circuit 30. However, the switch elements of the switch circuit 50 may have other possible types (such as NMOS, PMOS or other types of transistors) according to practical implementation, and are not limited to the exemplification in the present example.

For example, the first switch T1 determines whether to turn on or turn off the second switch T2 and the third switch T3 according to an exclusive NOR gate 102 of the first switch T1. If both the electronic device 200 and the battery module 150 are in the charge state or in the discharge state at the same time, then the first determination circuit 10 (that is, the exclusive NOR gate 102) provides a logic high signal "1" to turn on the first switch T1.

For example, if a logic high signal "1" is inputted from the terminal S1, the first switch T1 will be turned on but the second switch T2 and the third switch T3 will be turned off. The voltage on the terminal A (denoting the battery module 150) will be divided by the resistors R1~R2. If the resistor R1 is larger than the resistor R2, then a smaller voltage drop is on the terminal C of resistor R2.

Further, if the battery module 150 is coupled to the electronic device 200, the second determination circuit 30 provides a logic high signal "1". The fourth switch T4 determines whether to turn on or turn off the fifth switch T5 according to the second determination circuit 30. For example, if the battery module 150 is coupled to electronic device 200, the second determination circuit 30 provides a logic high signal "1" to turn off the fourth switch T4. So, the fourth switch forms an open loop and the fifth switch T5 is turned off. If the fifth switch T5 is turned off, the terminal C is disconnected from the ground terminal, so that the smaller voltage drop on the resistor R2 turns on the sixth switch T6 for forming a charge-discharge path P between the battery module 150 and the electronic device 200. In other words, the sixth switch T6 forms a charge-discharge path according to whether the first to the fifth switch (T1~T5) are turned on.

At step S208, the switch circuit 50 breaks (or interrupts) the charge-discharge path P between the battery module 150 and the electronic device 200. For example, if the electronic device 200 and the battery module 150 are not in the same status at the same time, the switch circuit 50 will not form a charge-discharge path P. If the battery module 150 and the electronic device 200 are not coupled, the switch circuit 50 will not form the charge-discharge path P. In other words, only both if the electronic device 200 and the battery module 150 are in the same status and if the battery module 150 and the electronic device 200 are coupled, the switch circuit 50 forms the charge-discharge path P for charging the battery module 150 or providing power to the electronic device 200 from the battery module. Thus, the battery module 150 and the electronic device 200 will not be pending which occurs due to the battery module 150 and the electronic device 200 are not in the same status. Wherein, the occurrence of pending may cause an electronic device to be shut down.

According to the battery charge-discharge path management circuit and the method thereof disclosed in the above embodiments of the invention, a charge-discharge path is formed or interrupted by a switch circuit according to the status of the electronic device and the status of the battery module, so to avoid the battery module and the electronic device being pended due to the battery module 150 and the electronic device 200 are not in the same status. So, the electronic device will not be shut down unexpectedly. The battery charge-discharge path management circuit and the method thereof disclosed in the embodiments of the invention have the advantage of providing high efficiency and high security during the charge or discharge of the battery.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A battery charge-discharge path management circuit coupled to a battery module and an electronic device, the battery charge-discharge path management circuit comprising:
   a first determination circuit for determining whether the battery module and the electronic device are in a same state at the same time;
   a second determination circuit for determining whether the electronic device is coupled to the battery module; and
   a switch circuit for forming a charge-discharge path between the battery module and the electronic device both if the battery module and the electronic device are in the same state at the same time and if the electronic device is coupled to the battery module;
   wherein the same state corresponds to a charge state or a discharge state.

2. The circuit according to claim 1, wherein the electronic device comprises a charge integrated circuit and the first determination circuit determines whether the electronic device is in the same state according to the charge integrated circuit.

3. The circuit according to claim 1, wherein the battery module comprises a charge protection integrated circuit and the first determination circuit determines whether the battery module is in the same state according to the charge protection integrated circuit.

4. The circuit according to claim 1, wherein the switch circuit interrupts the charge-discharge path between the battery module and the electronic device if the electronic device is not coupled to the battery module.

5. The circuit according to claim 1, wherein the switch unit interrupts the charge-discharge path between the battery and the electronic device if the battery module and the electronic device are not in the same state at the same time.

6. The circuit according to claim 1, wherein the first determination circuit comprises an exclusive NOR gate.

7. The circuit according to claim 6, wherein the switch circuit comprises a first switch, a second switch and a third switch; and the first switch determines whether to turn on or turn off the second switch and the third switch according to the exclusive NOR gate.

8. The circuit according to claim 7, wherein the switch circuit further comprises a fourth switch and a fifth switch; and the fourth switch determines whether to turn on or turn off the fifth switch according to the second determination circuit.

9. The circuit according to claim 8, wherein the switch circuit further comprises a sixth switch; and whether the sixth switch is turned on is determined according to the first switch to the fifth switch.

10. A battery charge-discharge path management method, comprising:
    determining whether a battery module and a the electronic device are in a same state at the same time;
    determining whether the electronic device is coupled to the battery module; and
    forming a charge-discharge path between the electronic device and the battery module both if the battery module and the electronic device are in the same state at the same time and if the electronic device is coupled to the battery module;
    wherein the same state corresponds to a charge state or a discharge state.

11. The method according to claim 10, wherein the same state of the electronic device is determined according to a charge integrated circuit of the electronic device.

12. The method according to claim 10, wherein the same state of the battery module is determined according to a charge protection integrated circuit of the battery module.

13. The method according to claim 12, further comprising:
    interrupting the charge-discharge path between the battery module and the electronic device if the electronic device is not coupled to the battery module.

14. The method according to claim 10, further comprising:
    interrupting the charge-discharge path between the battery module and the electronic device if the battery module and the electronic device are not in the same state at the same time.

* * * * *